US00RE47323E

(19) United States
(12) Reissued Patent
Funabashi

(10) Patent Number: US RE47,323 E
(45) Date of Reissued Patent: Mar. 26, 2019

(54) CLEANING MEMBER, CHARGING DEVICE, TRANSFER DEVICE AND IMAGE FORMING APPARATUS

(71) Applicant: FUJI XEROX CO., LTD., Minato-ku, Tokyo (JP)

(72) Inventor: Eiji Funabashi, Minami Ashigara (JP)

(73) Assignee: FUJI XEROX CO., LTD., Tokyo (JP)

(21) Appl. No.: 14/918,010

(22) Filed: Oct. 20, 2015

Related U.S. Patent Documents

Reissue of:
(64) Patent No.: 6,701,105
Issued: Mar. 2, 2004
Appl. No.: 10/228,333
Filed: Aug. 27, 2002

(30) Foreign Application Priority Data

Aug. 27, 2001 (JP) ..... 2001-256316

(51) Int. Cl.
*G03G 15/02* (2006.01)
*G03G 21/00* (2006.01)

(52) U.S. Cl.
CPC ..... *G03G 15/0225* (2013.01); *G03G 21/0058* (2013.01); *G03G 2215/1657* (2013.01)

(58) Field of Classification Search
CPC ..... G03G 15/0812; G03G 15/0817; G03G 15/0216; G03G 15/1675; G03G 15/168; G03G 15/0808; G03G 5/04; G03G 21/0035; C23C 14/0036; A47L 17/08
USPC ..... 399/103, 150, 284, 310, 101, 148, 285, 399/297; 15/265.5, 1.51, 256.5; 347/225; 264/321
See application file for complete search history.

(56) References Cited

U.S. PATENT DOCUMENTS 4,999,678 A * 3/1991 Tange ..... 15/256.53 X
5,260,754 A * 11/1993 Yano ..... G03G 21/0035 15/256.5
5,450,184 A * 9/1995 Yanai ..... G03G 21/0017 15/256.5
5,479,243 A * 12/1995 Kurokawa ..... G03G 15/0216 399/159
5,515,146 A * 5/1996 Harasawa ..... G03G 15/1675 399/310

(Continued)

FOREIGN PATENT DOCUMENTS

JP 63-163388 * 7/1988
JP S63-163388 A 7/1988

(Continued)

OTHER PUBLICATIONS

Apr. 26, 2005 Office Action issued in Japanese Application No. 2001-256316.

(Continued)

*Primary Examiner* — Christopher E. Lee
(74) *Attorney, Agent, or Firm* — Oliff PLC

(57) ABSTRACT

The present invention provides a cleaning member including melamine resin foam in at least a portion that contacts an object to be cleaned. A charging device and a transfer device including the cleaning member are provided as well. An image forming apparatus including at least the cleaning member is also provided. In the image forming apparatus the cleaning member cleans at least one of a charge roll of the charging device, an image carrier, and a transfer roll of the transfer device.

15 Claims, 2 Drawing Sheets

(56) References Cited

U.S. PATENT DOCUMENTS

| | | | | | |
|---|---|---|---|---|---|
| 5,568,243 | A | * | 10/1996 | Durfee et al. | 399/345 X |
| 5,572,293 | A | * | 11/1996 | Kikuchi et al. | 399/357 |
| 5,640,663 | A | * | 6/1997 | Hirai | C23C 14/0036 257/E31.094 |
| 5,666,599 | A | * | 9/1997 | Miyasaka | G03G 5/04 347/225 |
| 5,749,030 | A | * | 5/1998 | Park | G03G 15/0216 399/148 |
| 5,799,229 | A | * | 8/1998 | Yokoyama et al. | 399/100 |
| 5,834,116 | A | * | 11/1998 | Sawa | G03G 15/0808 399/285 |
| 5,895,151 | A | * | 4/1999 | Kinoshita | G03G 15/0812 399/284 |
| 5,905,932 | A | * | 5/1999 | Morse | G03G 21/0035 15/1.51 |
| 5,978,630 | A | | 11/1999 | Chang et al. | |
| 6,029,029 | A | * | 2/2000 | Danzuka | 399/100 |
| 6,064,470 | A | * | 5/2000 | Karashima | G03G 15/168 399/101 |
| 6,195,515 | B1 | * | 2/2001 | Fujita | G03G 15/0817 399/103 |
| 6,334,034 | B1 | * | 12/2001 | Kitazawa et al. | 399/100 |
| 6,334,042 | B1 | * | 12/2001 | Quesnel | 399/353 |
| 6,383,700 | B1 | * | 5/2002 | Yamazaki et al. | 430/66 |
| 6,389,255 | B1 | * | 5/2002 | Sawada et al. | 399/100 X |
| 6,479,202 | B2 | * | 11/2002 | Shida et al. | 430/58.2 |
| 6,503,615 | B1 | * | 1/2003 | Horii et al. | 428/316.6 |
| 6,608,118 | B2 | * | 8/2003 | Kosaka | A47L 17/08 264/321 |
| 2001/0002956 | A1 | * | 6/2001 | Sugiyama | G03G 15/168 399/297 |
| 2001/0019674 | A1 | * | 9/2001 | Asano et al. | 399/223 |

FOREIGN PATENT DOCUMENTS

| | | | | |
|---|---|---|---|---|
| JP | H02-272594 | A | | 11/1990 |
| JP | 03-107985 | | * | 5/1991 |
| JP | H03-107985 | A | | 5/1991 |
| JP | H05-006041 | A | | 1/1993 |
| JP | H07-110618 | A | | 4/1995 |
| JP | H07-140865 | A | | 6/1995 |
| JP | H08-050398 | A | | 2/1996 |
| JP | H08-137198 | A | | 5/1996 |
| JP | H09-006200 | A | | 1/1997 |
| JP | 3045160 | U | | 1/1998 |
| JP | H10-254215 | A | | 9/1998 |
| JP | H11-128137 | A | | 5/1999 |
| JP | 1999-195326 | A | * | 7/1999 |
| JP | H11-249524 | A | | 9/1999 |
| JP | H11-295965 | A | | 10/1999 |
| JP | H11-316466 | A | | 11/1999 |
| JP | 2000-122505 | A | | 4/2000 |
| JP | 2000-221811 | A | * | 8/2000 |
| JP | 2000-242021 | A | | 9/2000 |
| JP | 2000-342502 | A | | 12/2000 |
| JP | 2001-169985 | A | | 6/2001 |
| JP | 2001-193731 | A | | 7/2001 |
| JP | 2001-209202 | A | | 8/2001 |
| JP | 2001-258809 | | * | 9/2001 |
| JP | 2001-258809 | A | | 9/2001 |
| JP | 2002-059443 | | * | 2/2002 |
| JP | 2002-059443 | A | | 2/2002 |
| JP | 2002-221874 | A | | 8/2002 |

OTHER PUBLICATIONS

Jul. 19, 2005 Office Action issued in Japanese Application No. 2001-256316.

Mar. 27, 2007 Office Action issued in Japanese Application No. 2001-256316.

Apr. 11, 2006 Office Action issued in Japanese Application No. 2001-256316.

* cited by examiner

CLEANING MEMBER, CHARGING DEVICE, TRANSFER DEVICE AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a Reissue of U.S. Pat. No. 6,701,105, issued Mar. 2, 2004, which issued from U.S. application Ser. No. 10/228, 333, filed Aug. 27, 2002, which claims the benefit of Japanese Patent Application No. 2010-256316, filed Aug. 27, 2001. The disclosure of each of the prior applications is hereby incorporated by reference herein in its entirety.*

BACKGROUND OF THE INVENTION

1. Field of the Invention

The present invention relates to a cleaning member, a charging device, a transfer device and an image forming apparatus used for a printer, a copying machine, or the like.

2. Description of the Related Art

In general, an image forming process in an electrophotographic image forming apparatus using a toner as a developing agent comprises mainly the following steps:

(1) preliminary exposure of an image carrier (photosensitive member) (this step can be omitted when an alternating current voltage is applied to a direct current voltage so as to be superimposed thereon, as has been carried out recently), (2) charging the image carrier surface, (3) forming a latent image by exposure, (4) forming a visual image using toner, (5) transferring the toner image onto a transfer material (paper, or the like), (6) cleaning the image carrier surface after the transfer, and (7) fixing the toner image on the transfer material by heating, or the like.

Recently, as an important issue for electrophotographic image forming apparatuses, attention has been paid to making the life of the apparatuses longer.

This is aimed at reducing the film reduction of the image carrier disposed in the center of the electrophotographic image forming apparatus so as to maintain good image formation for a longer time. This in turn is greatly effective in reducing operating cost.

It is known that the charging mechanism is greatly influenced by film reduction of the image carrier. Types of the charging mechanism vary widely. For example, contact charging, which has been in use for about 10 years, is for applying a charging bias by rotatingly a charge roller which comprises an elastic member with resistance adjusted so as to be semi conductive (about $10^5$ Ωcm),in contact with the image carrier. The charge bias at a time when an alternating current voltage having an inter-peak voltage of at least two times as high as a discharge starting voltage of a direct current is superimposed and applied to a direct current voltage. Due to the application of the alternating current voltage, the potential of the image carrier surface is converged to the applied direct current voltage value, and as a result, uniform charging of the image carrier surface can be achieved.

Moreover, since the above-described contact charging utilizes pulse discharge in a minute space between the image carrier and the charge roller, a generated amount of ozone, which is harmful to human bodies, can be kept to an extremely small amount compared with a corotron charge, which was used previously, and drastic reduction in a cost of the charge member can be achieved. Thus, contact charging is now in the mainstream of charging methods.

However, since contact charging changes the image carrier surface by utilizing pulse discharge as described above, the image carrier surface is always in an etched state. This results in a harmful effect in that the film reduction of the image carrier is further accelerated.

Therefore, in order to reduce the film reduction of the image carrier by restraining the pulse discharge, the following novel charging mechanisms have been proposed.

(1) Direct Current (DC) Charging (a Method of Applying only a Direct Current Voltage to the Contact Charge Roller)

This method is for charging the image carrier surface only using direct current voltage. Since alternating current voltage is not applied, the amount of current flowing to the image carrier is extremely small. That is, the pulse discharge to the image carrier is reduced as well. As a result, etching with regard to the image carrier (photosensitive member) is reduced, and the film reduction of the image carrier is kept to a smaller amount.

(2) Non-contact Charging (a Method of Applying an Alternating Current Voltage Superimposed on a Direct Current Voltage while Providing a Certain Gap between the Image Carrier and the Charge Roller)

Compared with contact charging (when applying an alternating current voltage superimposed on a direct current voltage), this method has an extremely small inflow of current to the image carrier. In contrast to a current generated by a nip of the charge roller and the image carrier and a discharge current accompanying a pulse discharge generated in a gap in a range satisfying the Paschen's discharge start voltage existing on the right and left sides of the nip by the contact charge, by providing a certain gap between the image carrier and the charge roller the nip current generation can be prevented and the pulse discharge is generated only at the shortest part of the gap between the image carrier and the discharge roller. Thus, etching with respect to the image carrier can be reduced so that the film reduction of the image carrier can be kept to a small amount.

However, the above-described charging mechanisms respectively have the following problems.

(1) Direct Current (DC) Charging

The amount of discharge current in DC charging is determined by a resistance value of the contact charge roller, so that the pulse discharge state depends largely on the properties of a surface of the contact charge roller. Therefore, in order to uniformly charge only by applying a direct current voltage on the image carrier surface, compared with the case of applying an alternating current voltage superimposed on direct current voltage, a further even electric resistance and surface smoothness are required. Therefore, in order to improve the electric resistance evenness and the surface smoothness, cost increase cannot be avoided.

Moreover, according to the DC charging, contamination (transfer toner, paper dusts, or the like) can easily adhere to the charge roller surface. Since the electric resistance and the surface condition are varied by the adhered contamination, the uniform charging can easily be inhibited. This is considered that the contamination adhered on the charge roller can hardly be eliminated due to absence of the oscillating electrolysis because the alternating current voltage is not applied.

Therefore, in order to maintain a exellent image over a long time while reducing the film reduction of the image carrier according to the DC charging, a cleaning mechanism for the charge roller or a mechanism for completely preventing adhesion of contamination on the charge roller is indispensable.

With respect to the above-described problems, a method of forming the surface layer of the charge roller with a high mold releasing property material, a method of applying an inverse bias which is polarity opposite to the charge polarity every certain period of time for inverting the polarity of the residual toner so as to be moved onto the image carrier, or the like have been attempted. However, the mold releasing property of the surface is lowered as time passes by as well as the effect of the inverse bias is lowered, so that a high image quality cannot be provided over a long time in the present situation.

(2) Non-contact Charging

According to the non-contact charging, since a certain gap is provided between the image carrier and the charge roller, the applied bias necessary for charging should be increased. This is apparent from the approximate expression of the Paschen's discharge start voltage: $VTH=312+6.2\times Z$ (Z is gap amount (μm)).

The increase of the applied bias brings about increase of the ozone generating amount, so that the amount of the discharge product (NOx, or the like) adhered on the image carrier surface is increased.

Moreover, in the case of applying an alternating current voltage superimposed on a direct current voltage in the non-contact charging, since the alternating current applied bias is naturally increased as well, the potential difference between the charging member surface and the image carrier surface is enlarged. Thereby, the charging member can easily attract the transfer residual toner, the paper dusts, or the like on the image carrier. As a result, the contamination accumulation amount on the charging member tends to be increased.

SUMMARY OF THE INVENTION

In view of the above-described situation, a subject of the present invention is to provide a cleaning member, a charging device, a transfer device and an image forming apparatus, capable of reducing wear of an object to be cleaned such as an image carrier to an extremely small extent so as to maintain the performance of a charging member in a good state over a long time.

A cleaning member according to a first aspect of the invention comprises melamine resin foam in at least a portion thereof that contacts an object to be cleaned.

Further, a charging device according to another aspect of the invention comprises a cleaning member for cleaning an object, the cleaning member comprising melamine resin foam in at least a portion thereof that contacts the object to be cleaned; and a charge roller.

Furthermore, a transfer device according to still another aspect of the invention comprises a cleaning member for cleaning an object, the cleaning member comprising melamine resin foam in at least a portion thereof that contacts the object to be cleaned; and a transfer roller.

Moreover, an image forming apparatus according to yet another aspect of the invention comprises at least the cleaning member according to the first aspect, wherein the cleaning member cleans at least one of a charge roll of a charging device, an image carrier, and a transfer roll of a transfer device.

The image forming process of the image forming apparatus can be for example, an electrophotography process, an electrostatic recording process, a magnetic recording process, or the like.

Moreover, the image carrier in the invention is a photosensitive member, an intermediate transfer member, or the like, and the shape thereof can be cylindrical, belt-like, or the like and it is not particularly limited.

DESCRIPTION OF THE PREFERRED EMBODIMENTS

Figure 1:
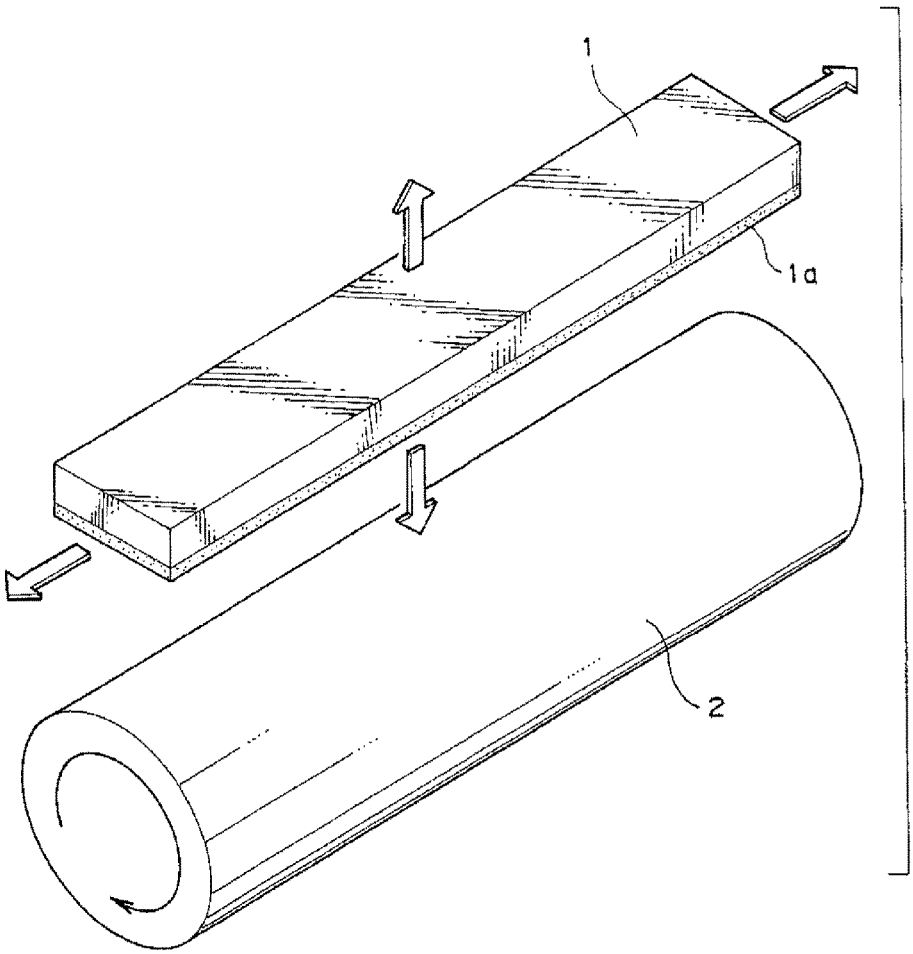
FIG. 1 is diagram for explaining the state with a cleaning member of the present invention contacted with an object to be cleaned.

A cleaning member, a charging device, a transfer device and an image forming apparatus of the invention will now be explained.

Cleaning Member

A cleaning member according to the invention comprises melamine resin foam in at least a portion thereof that contacts an object to be cleaned.

The melamine resin foam in general can be prepared by a method of compounding catalyst, emulsifying agent, or the like to a main raw material such as melamine, formaldehyde, or the like, and after adding and mixing foaming agent therein, directing an electron beam thereon.

Moreover, it is preferable that the melamine resin foam has a three-dimensional mesh-like structure. The "three-dimensional mesh-like structure" denotes a structure with a sub micron order fiber-like melamine resin coupled three-dimensionally in a state finely entangled with each other so as to form minute cells.

According to the melamine resin foam having the three-dimensional mesh-like structure, the sub micron order fiber-like melamine resin enters into the minute ruggedness on the image carrier or the charging member so as to scrape out dust such as residual toner and paper dusts so that the surface of the image carrier, the charging member, or the like can be maintained in a state without contamination.

Moreover, since the sub micron order fiber-like melamine resin can provide cleaning performance without being strongly pressed against the image carrier or the charging member, the melamine resin does not damage the surface of the image carrier of the charging member or does not fix contamination on the surface of the image carrier or the charging member.

Furthermore, according to the conventional cleaning sponge, since only closed or open cells are provided, the cells can be easily clogged by dust. In contrast, by using the cleaning member having the three-dimensional mesh-like structure, since collected dust does not remain in one cell and dust will not become clogged therein, the performance of the cleaning member can be maintained over a long time.

The three-dimensional mesh-like structure of the melamine resin foam having the three-dimensional mesh-like structure can be formed as follows. Sufficiently kneading a melamine resin and a resin which dissolves by a specific solvent, heat-curing the same, and by soaking the same in the specific solvent, a three-dimensional mesh-like structure with only the melamine resin part remaining can be provided.

Moreover, as the melamine resin foam, a commercially available product may be used as well. For example, BASOTECT produced by BASF Ltd., can be used. Since BASOTECT has a heat-cured three-dimensional mesh-like structure, the above-described effects can be provided.

It is preferable that the cleaning member of the invention is used for cleaning at least one of objects to be cleaned, such as an image carrier, a charging member and a transfer member. The charging member to be cleaned denotes mainly a charge roll, and the transfer member denotes mainly a transfer roll.

The shape of the cleaning member according to the invention is not particularly limited, and various shapes such as a brush shape, a pad shape and a roller shape can be used. Moreover, the whole cleaning member may be constructed of melamine resin foam. The cleaning member may, however, be constructed so that only a portion of the cleaning member which abuts the image carrier or the charging member comprises melamine resin foam.

The cleaning member according to the invention may be either insulative or conductive.

If the cleaning member is conductive, the cleaning member may serve also as a charging member for charging the image carrier. Moreover, if the cleaning member is conductive, a cleaning bias may be applied thereon. Furthermore, here "conductive" means semi conductive as well.

The method for imparting conductivity to the cleaning member is not limited, and conventional method such as including a conductive material in the cleaning member blowing conductive particles onto the cleaning member, or the like can be used. However, it is preferable to use impregnation which is a method of impregnating a cleaning member with a conductive varnish with electric resistance adjusted to $10^3$ to $10^{10}$ Ω (preferably $10^4$ to $10^8$ Ω). According to the impregnating method, a cleaning member with an extremely stable electric resistance can be provided at extremely low cost.

Examples of the conductive varnish, include those prepared by dispersing carbon in urethane, silicon, styrene, or the like, and dissolving the same in a solvent (such as ethyl acetate, toluene and methyl ethyl ketone), or the like.

It is preferable that the cleaning member of the invention is disposed so as to approach and/or separate freely from an object to be cleaned such as an image carrier, a charging member and a transfer member.

In the case a cleaning operation is not required (in a case such as the image forming apparatus is stopped for a long time), or in the case the cleaning is used as a cleaning member for an intermediate transfer member of a four cycle color image forming apparatus (an image forming apparatus of repeating a step of transferring a toner image from a photosensitive member to an intermediate transfer member for each of four colors of Y, M, C, K), the cleaning member is need to be disposed away from the image carrier, the charging member, or the like.

Moreover, it is preferable that the cleaning member of the invention is disposed so as to reciprocally move in the axis direction of the object to be cleaned. Specifically, as shown in FIG. 1, it is preferable that a melamine resin foam portion 1a of the cleaning member 1 is disposed so as to abut the surface of the roll-like object to be cleaned 2 in a state being movable to freely approach/separate therefrom, and being movable reciprocally in the axis direction of the object to be cleaned 2. According to the configuration, the surface of the object to be cleaned 2 can be cleaned evenly.

Charging Device, Transfer Device

The charging device of the invention includes the above-described cleaning member. Specifically, the charging device is preferable to be constructed so that the cleaning member is provided so as to freely approach/separate from the charge roller surface.

The transfer device of the invention includes the above-described cleaning member. Specifically, the transfer device is preferable to be constructed so that the cleaning member is provided so as to freely approach/separate from the transfer roller surface.

Image Forming Apparatus

Figure 2:
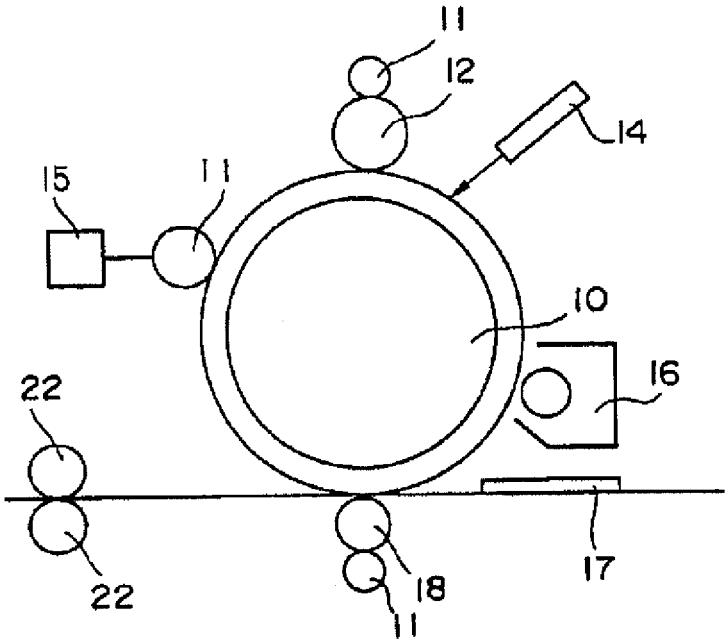
FIG. 2 is a schematic configuration view showing an embodiment of an image forming apparatus comprising the cleaning member of the invention.

A schematic configuration of the image forming apparatus including the cleaning member of the invention is shown in FIG. 2. The image forming apparatus shown in FIG. 2 includes an image carrier 10 as an electrophotography photosensitive member, a charge roll 12 as a contact charging type charging device, a laser exposing optical system 14, a developer 16 using a developing material (toner), a transfer roll 18 as a transfer device and fixing rolls 22. The cleaning member 11 is provided so as to freely approach/separate from the surface of the image carrier 10, the transfer roll 18 and the charge roll 12. Further, if the cleaning member is conductive, a cleaning bias 15 may be applied thereon.

The position of providing the cleaning member 11 is not limited to the above-described embodiment, and is provided for cleaning at least one of the charge roll 12, the image carrier 10 and the transfer roll 18.

The image forming mechanism will be explained with reference to the image forming apparatus shown in FIG. 2. First, the surface of the image carrier 10 is uniformly charged by the charge roll 12. Light is irradiated to non-image portions thereof by the optical laser-exposure system 14 to eliminate the electric charge at the portions to which light is irradiated so as to form an electrostatic latent image with the electric charge remaining in the image portions. In the developer 16 using a toner as a developing agent, the toner which is charged to the reversed polarity of the electrostatic latent image is adhered to the electrostatic latent image so as to form a visible image, i.e., a loner image (developing step). Next, a toner-receiving member 17 is inserted between the photosensitive member 10 having the toner image formed thereon and the transfer roll 18, and the toner image is supported on the toner-receiving member 17 so as to transfer the toner image onto the toner-receiving member 17 (transfer step). The transferred toner image is moved to two fixing rolls 22 contacting each other, and is passed through a nip portion of the two fixing rolls 22 for fixation by heat and/or pressure so that an image is formed (fixing step).

The toner on the surface of the image carrier 10 which did not be transferred (residual toner) is eliminated by the cleaning member 11. Moreover, the residual toner, or the like adhered on the charge roll surface is eliminated by the cleaning member 111 as well. By repeating the series of the process, the process from charging the toner to the process to eliminate the residual toner, images can be formed successively.

Here, as to the shape of the cleaning member 11, known shapes such as a roll shape, a pad shape and a brush shape can be adopted.

In the image forming apparatus having the cleaning member of the invention, it is preferable to use a spherical toner capable of using various kinds of developing agents. It is more preferable to use a spherical toner produced by the polymerization method.

Since the spherical toner produced by the polymerization method is spherical (preferable sphericity (shape coefficient SF-1): 100 to 150) and the particle diameter thereof is extremely homogeneous, it provides a high transfer efficiency to a transfer material (paper) so as to form a sharp image.

The image carrier 10 preferably includes a surface layer 9 (outermost layer) having the charge transportation property, produced from a siloxane based resin having a cross-linking structure.

Since the surface layer of the image carrier is a film produced from a siloxane based resin having a cross-linking structure to be hardly abraded, since the surface film reduction can be restrained to an extremely small extent, a longer life can be achieved so that the running cost can be reduced as well.

EXAMPLES

The present invention will be explained with reference to the following examples. However, the invention is not limited thereto.

Example 1

A layer comprising a melamine resin foam (BASOTECT, produced by BASF Ltd.) was adhered to an outer circumferential surface of a 4 mm diameter metal (SUS) core metal using a conductive adhesive (SHINTRON D-4256, produced by Shinto Paint Co., Ltd.). A thickness of the layer was adjusted to 2 mm via rotational polishing so as to produce cleaning members with an 8 mm outer diameter.

An average cell diameter of the produced layer comprising the melamine resin foam formed on the outer circumferential surface of the cleaning member was 3 μm.

As shown in FIG. 2, the produced cleaning members were respectively mounted at a cleaning position for an image carrier and a cleaning position for a charging member in a black and white image forming apparatus so as to respectively bite 0.3 mm into the image carrier and the charging member.

At the time, as the image carrier, a photosensitive material coated by a siloxane based resin film having a cross-linking structure by a 3 μm thickness as the outermost layer was used. As the toner, an acrylic based polymerized toner (volume average particle diameter 5.5 μm) was used.

Moreover, as the charging member, a charge roller with a two-layer construction having an EPDM (Ethylene Propylen Dien Monomer) foam layer (thickness: 3 mm) and a tube covering layer (thickness: 1 mm), which included a styrene based elastomer, formed successively on an outer circumferential surface of a 6 mm diameter metal core was used.

Using the above-described image forming apparatus, a 50,000 sheet image outputting test was executed under the following (1) to (3) environments. The applied bias was a direct current voltage −1,400 V.

Environment (1) High temperature/high humidity environment (temperature: 28° C., humidity: 85% Rh)

(2) Low temperature/low humidity environment (temperature: 10° C., humidity: 15% Rh)

(3) Standard environment (temperature: 22° C., humidity: 55% Rh) According to the result of the test, it was found that any problem was not found either in images in the initial stage or the 50,000th image in any of the (1) to (3) environments, and abnormalities such as flaws or pin holes were not observed at all in the image carrier or the charging member.

Moreover, after the test, the abrasion amount of the CT layer (charge transportation layer) of the image carrier was 0.2 μm in the low temperature/low humidity environment (temperature: 10° C., humidity: 15% Rh). Contamination was scarcely found on the charge roller surface, or significant change such as flaws and stripes were not observed as well.

Example 2

To 100 parts by mass of phenol resin, 5 parts by mass of glass fiber, 3 parts by mass of talc, 2 parts by mass of calcium oxide, 5 parts by mass of conductive carbon black, 15 parts by mass of conductive titanium oxide, 3 parts by mass of conductive tin oxide, 3 parts by mass of dispersion auxiliary agent (zinc stearate), and 1 part by mass of surface modifier (silicon based waxes) were added. After dry blending, the material was extrusion molded into a pipe-like shape by using a two-ax extruder so as to produce a compact.

A metal shaft with a conductive adhesive apllied thereon was press-fitted into the produced compact pipe. Thereafter, a polishing operation was performed using a centerless polishing device so as to make a 14 mm pipe outer diameter for producing a charge roller.

The hardness of the produced charge roller was 95 degrees in Asker C. The electric resistance was $1\times10^6$ Ωcm in all of the testing environment, the high temperature/high humidity environment (temperature: 28° C., humidity: 85% Rh), the low temperature/low humidity environment (temperature: 10° C., humidity: 15% Rh), and the standard environment (temperature: 22° C., humidity: 55% Rh). The surface smoothness thereof was 0.8 μm in Rz.

Moreover, the outer diameter deflection measured at three points in the longitudinal direction was 10 μm or less, and the straightness of a single resistance layer was 10 μm or less, and thus a charge roller with an extremely high accuracy was provided.

Spacer members (collars) 30 μm made of POM (polyacetal) were mounted on both of the ends in the longitudinal direction of the produced charge roller, and the charge roller it was mounted in the image forming apparatus shown in FIG. 2 for producing a non-contact charge roller with a gap with respect to the image carrier set at 30 μm.

In the same process as in Example 1 except that the charge roller was a non-contact charge roller, a 50,000 sheet image outputting test was performed with the cleaning member provided.

As to the applied bias here, 2,400 Vpp alternating current voltage was applied and superimposed on −700 V direct current voltage by 1,500 Hz frequency.

Moreover, as the image carrier at the time, an ordinary OPC (organic photo-conductor) photosensitive material was used. As the toner, an acrylic based polymerized toner (volume average particle diameter: 5.5 μm) was used.

As a result, it was found that any problem was not found either in images in the initial stage or the 50,000th image in any of the testing environment, the high temperature/high humidity environment (temperature: 28° C., humidity: 85% Rh), the low temperature/low humidity environment (temperature: 10° C., humidity: 15% Rh), and the standard environment (temperature: 22° C., humidity: 55% Rh), and abnormalities such as flaws and pin holes were not observed at all in the image carrier or the charging member.

The abrasion amount of the CT layer of the image carrier was 0.2 μm in the low temperature/low humidity environment (temperature: 10° C., humidity: 15% Rh).

Moreover, contamination was scarcely found on the charge roller surface, or significant change such as flaws and stripes were not observed as well.

Example 3

In the same manner as in Example 1, a layer (thickness: 2 mm) comprising melamine resin foam was formed on an outer circumferential surface of a 4 mm diameter metal (SUS) core metal. Then, after being soaked (impregnated) in a conductive varnish (EMRALON JLY601, produced by Acheson Japan Limited) having electric resistance adjusted to $10^5$ Ω for providing semi conductivity, vibration was applied by ultrasonic waves for sufficiently permeating the conductive varnish to the deepest part of the melamine resin foam. The solution was dried at 80° C. for 10 minutes so as to produce a cleaning member with an 8 mm outer diameter.

An average cell diameter of the produced cleaning member was 3 μm, and the electric resistance was $5\times10^8$ Ω.

In the same manner as in Example 1 except that the above-described cleaning member was used, a 100,000 sheet image outputting test was performed in each environment.

As the image carrier, one coated to a 3 μm thickness at an outermost layer with a siloxane based resin film having a cross-linked structure was used. As the toner, an acrylic based polymerized toner (volume average particle diameter 5.5 μm) was used.

Moreover, the bias applied to the image carrier was direct current voltage −1,400 V, and a cleaning cycle was provided in which an inverse bias and a normal bias were alternately applied for 2 seconds per 500 sheets of image formation.

As a result, it was found that any problem was not found either in images in the initial stage or the 100,000th image in any of the testing environment, the high temperature/high humidity environment (temperature: 28° C., humidity: 85% Rh), the low temperature/low humidity environment (temperature: 10° C., humidity: 15% Rh), and the standard environment (temperature: 22° C., humidity: 55% Rh).

The abrasion amount of the CT layer of the image carrier at the time was 1.2 μm in the low temperature/low humidity environment (temperature: 10° C., humidity: 15% Rh).

Moreover, contamination was scarcely found on the image carrier surface or the charge roller surface, or significant change such as flaws and stripes were not observed as well.

Comparative Example 1

In the same manner as in Example 1 except that a urethane sponge (cell diameter: 50 μm) was used as the cleaning member, a 50,000 sheet image outputting test was performed in each environment (above-described (1) to (3)).

As a result, image deficiency such as streaked (striped) uneveness was observed on the images from about 5,000th sheets in the low temperature/low humidity environment (temperature 10° C., humidity 15% Rh).

At the same time, from the observation of the surface of the image carrier and the charge roller, deep stripes and toner adhesion were observed at the position corresponding to the stripes on the image.

This phenomenon further deteriorated according to increase of the image formation number, and the stripe-like pattern was observed on the entire surface of the 50,000th image.

Furthermore, from the observation of the cleaning member, clogged toner and paper dusts were found in most of the cells which were observed.

Comparative Example 2

In the same manner as in Example 3 except that an EPDM sponge (electrical resistance: $4\times10^8$ Ω, cell diameter: 50 μm)having semi conductivity was used as the cleaning member, a 50,000 sheet image outputting test was performed in each environment (above-described (1) to (3)).

As a result, image deficiency such as streaked (striped) uneveness was observed on the images from about 10,000th sheets in the low temperature/low humidity environment (temperature 10° C., humidity 15% Rh).

At the same time, from the observation of the surface of the image carrier and the charge roller, deep stripes and toner adhesion were observed at the position corresponding to the stripes on the image.

This phenomenon further deteriorated according to increase of the image formation number, and the stripe-like pattern was observed on the entire surface of the 50,000th image.

What is claimed is:

1. A cleaning member for cleaning an object that is at least one of an image carrier, a charging member and a transfer member, the *cleaning* member comprising:

*a conductive* melamine resin foam in at least a portion thereof that contacts the object to be cleaned, wherein the *conductive* melamine resin foam has a three-dimensional mesh structure*, and the cleaning member is formed in a roller shape and is a conductive member*.

[2. The cleaning member according to claim 1, wherein the cleaning member is formed in a pad shape or a roller shape.]

[3. The cleaning member according to claim 2, wherein the cleaning member is an insulative material.]

4. The cleaning member according to claim [2] *1*, wherein the cleaning member [is a conductive member and] can be used as a charging member.

[5. The cleaning member according to claim 4, wherein the conductive property of the cleaning member is provided by impregnating the cleaning member with a conductive varnish.]

[6. The cleaning member according to claim 5, wherein the cleaning member is disposed to freely approach and/or separate from the object to be cleaned.]

7. The [cleaning member] *transfer device* according to claim [6] *13*, wherein the cleaning member is disposed to move reciprocally in an axis direction of the [object to be cleaned] *transfer roller*.

[8. The cleaning member according to claim 7, wherein a cleaning bias is applied to the cleaning member.]

9. An image forming apparatus comprising the cleaning member according to claim 1, wherein a spherical toner is used as a developing agent.

10. The image forming apparatus according to claim 9, wherein a surface layer of the image carrier has a charge transportation property and comprises a siloxane based resin having a cross-linking structure.

11. A charging device comprising:

*a charge roller; and* a cleaning member for cleaning [an object] *the charge roller*, the cleaning member comprising *a conductive* melamine resin foam in at least a portion thereof that contacts the [object to be cleaned] *charge roller*, wherein the *conductive* melamine resin foam has a three-dimensional mesh structure[; and a charge roller], *and the cleaning member is formed in a roller shape and is a conductive member.*

12. The charging device according to claim 11, wherein the cleaning member is disposed to freely approach and/or separate from a surface of the charge roller.

13. A transfer device comprising:

*a transfer roller; and* a cleaning member for cleaning [an object] *the transfer roller*, the cleaning member comprising *a conductive* melamine resin foam in at least a portion thereof that contacts the [object to be cleaned] *transfer roller*, wherein the *conductive* melamine resin foam has a three-dimensional mesh structure[; and a transfer roller], *and the cleaning member is formed in a roller shape and is a conductive member.*

14. The transfer device according to claim 13, wherein the cleaning member is disposed to freely approach and/or separate from a surface of the transfer roller.

*15. The cleaning member according to claim 1, wherein the cleaning member has an electric resistance of from $10^3$ to $10^{10}$ Ω.*

*16. The cleaning member according to claim 1, comprising:*

*a core; and*

*an outer circumferential sheet laminated on an outer circumferential surface of the core, the outer circumferential sheet comprising the conductive melamine resin foam as a portion thereof that contacts the object to be cleaned.*

*17. The cleaning member according to claim 1, wherein the conductive melamine resin foam comprises melamine resin foam impregnated with a conductive varnish.*

*18. The transfer device according to claim 13, wherein the conductive melamine resin foam comprises melamine resin foam impregnated with a conductive varnish.*

*19. The charging device according to claim 11, wherein the cleaning member comprises:*

*a core; and*

*an outer circumferential sheet laminated on an outer circumferential surface of the core, the outer circumferential sheet comprising the conductive melamine resin foam as a portion thereof that contacts the charge roller.*

*20. The charging device according to claim 11, wherein the conductive melamine resin foam comprises melamine resin foam impregnated with a conductive varnish.*

* * * * *